United States Patent
Shamee et al.

(10) Patent No.: US 10,833,768 B2
(45) Date of Patent: *Nov. 10, 2020

(54) PHOTONIC MONOBIT ANALOG-TO-DIGITAL CONVERTER USING COHERENT DETECTION

(71) Applicant: Raytheon Company, Waltham, MA (US)

(72) Inventors: Bishara Shamee, Playa Del Rey, CA (US); Steven R. Wilkinson, Stevenson Ranch, CA (US)

(73) Assignee: Raytheon Company, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/359,263

(22) Filed: Mar. 20, 2019

(65) Prior Publication Data

US 2020/0304210 A1    Sep. 24, 2020

(51) Int. Cl.
    *H04B 10/556*     (2013.01)
    *H04B 10/61*     (2013.01)
    *H04B 10/2507*     (2013.01)

(52) U.S. Cl.
    CPC .......... *H04B 10/556* (2013.01); *H04B 10/61* (2013.01); *H04B 10/2507* (2013.01)

(58) Field of Classification Search
    None
    See application file for complete search history.

(56) References Cited

U.S. PATENT DOCUMENTS

| 5,444,447 A | 8/1995 | Wingender |
| 5,598,288 A * | 1/1997 | Collar ................ H04B 10/2507 398/141 |

(Continued)

FOREIGN PATENT DOCUMENTS

| EP | 2909712 A2 | 8/2015 |
| EP | 3370353 A1 | 9/2018 |

(Continued)

OTHER PUBLICATIONS

Kakande et al., QPSK Phase and Amplitude Regeneration at 56 Gbaud in a Novel Idler-Free Non-Degenerate Phase Sensitive Amplifier, 2011, OSA (Year: 2011).*

(Continued)

*Primary Examiner* — Jai M Lee
(74) *Attorney, Agent, or Firm* — Schwegman Lundberg & Woessner, P.A.

(57) ABSTRACT

A photonic monobit analog-to-digital converter (ADC) includes an incoherent optical source, a dual optical modulator, a coupler, a coherent detector, a limiter, and a DSP. The incoherent optical source generates an optical noise signal. The dual optical modulator modulates phase and amplitude of an input complex baseband signal onto an input optical signal to generate an optical modulated signal. The coupler couples the modulated signal with the optical noise signal to generate a dithered optical signal. The coherent detector coherently detects a dithered in-phase (I) signal component and a dithered quadrature (Q) signal component associated with the input complex baseband signal using the dithered optical signal and a reference optical signal. The limiter outputs a complex decision signal based on the dithered I and Q signal components. The DSP generates a digital signal representative of the input complex baseband signal based on the complex decision signal.

20 Claims, 9 Drawing Sheets

(56) References Cited

U.S. PATENT DOCUMENTS

| | | | |
|---|---|---|---|
| 6,002,480 A | 12/1999 | Izatt et al. | |
| 6,118,397 A | 9/2000 | Heflinger | |
| 6,448,921 B1 | 9/2002 | Tsui et al. | |
| 6,476,949 B1 | 11/2002 | Loh et al. | |
| 6,704,511 B1* | 3/2004 | Kerfoot, III | H04B 10/296 398/149 |
| 7,253,755 B1 | 8/2007 | Fette | |
| 7,406,304 B2 | 7/2008 | Busson et al. | |
| 7,423,564 B2 | 9/2008 | Kitayama et al. | |
| 7,973,688 B2 | 7/2011 | Huang et al. | |
| 8,699,882 B2 | 4/2014 | Shieh | |
| 8,738,956 B2 | 5/2014 | Chen et al. | |
| 8,965,211 B1 | 2/2015 | Zanoni et al. | |
| 9,608,653 B2 | 3/2017 | Le Dortz et al. | |
| 9,768,873 B2 | 9/2017 | Hajimiri et al. | |
| 9,843,398 B1 | 12/2017 | Zanoni et al. | |
| 9,900,096 B2 | 2/2018 | Hajimiri et al. | |
| 10,038,498 B1* | 7/2018 | Fan | H04B 10/50 |
| 10,298,256 B1* | 5/2019 | Robinson | H03M 3/328 |
| 10,700,700 B1 | 6/2020 | Shamee et al. | |
| 2002/0164125 A1 | 11/2002 | Berger et al. | |
| 2003/0007215 A1 | 1/2003 | Snawerdt | |
| 2003/0025957 A1 | 2/2003 | Jayakumar | |
| 2003/0115028 A1* | 6/2003 | Summerfield | H04B 10/07 703/6 |
| 2003/0198424 A1 | 10/2003 | Bennett | |
| 2004/0028414 A1* | 2/2004 | Quesenberry | H04B 10/504 398/141 |
| 2004/0218932 A1 | 11/2004 | Epworth et al. | |
| 2005/0270202 A1* | 12/2005 | Haartsen | H03M 1/04 341/143 |
| 2006/0182209 A1 | 8/2006 | Coyne et al. | |
| 2006/0262664 A1* | 11/2006 | Imoto | H04B 10/2537 369/1 |
| 2008/0031633 A1 | 2/2008 | Hoshida et al. | |
| 2008/0205886 A1* | 8/2008 | Anderson | H04B 10/07955 398/26 |
| 2009/0033424 A1* | 2/2009 | Nauta | H03H 11/1213 330/295 |
| 2009/0047030 A1 | 2/2009 | Hoshida | |
| 2009/0136240 A1* | 5/2009 | Malouin | H04B 10/5167 398/183 |
| 2009/0317075 A1 | 12/2009 | Mandai et al. | |
| 2010/0098411 A1 | 4/2010 | Nakashima et al. | |
| 2011/0052216 A1* | 3/2011 | Jiang | H04B 10/25133 398/208 |
| 2011/0123192 A1 | 5/2011 | Rosenthal et al. | |
| 2011/0150503 A1* | 6/2011 | Winzer | H04B 10/613 398/202 |
| 2012/0213531 A1 | 8/2012 | Nazarathy et al. | |
| 2013/0058647 A1* | 3/2013 | Boertjes | H04B 10/07955 398/38 |
| 2013/0216239 A1* | 8/2013 | Zhang | H04B 10/614 398/202 |
| 2014/0186033 A1* | 7/2014 | Winzer | H04B 10/50 398/39 |
| 2015/0154007 A1 | 6/2015 | Sussman et al. | |
| 2016/0173202 A1* | 6/2016 | Kelly | H04B 10/506 398/34 |
| 2016/0204875 A1 | 7/2016 | Araki et al. | |
| 2016/0204876 A1 | 7/2016 | Kamura et al. | |
| 2017/0237500 A1* | 8/2017 | Nishimoto | G08C 23/04 398/184 |
| 2018/0006732 A1 | 1/2018 | Pang et al. | |
| 2018/0074348 A1* | 3/2018 | Fujita | H04B 10/516 |
| 2018/0198533 A1 | 7/2018 | Zhou et al. | |
| 2018/0269964 A1* | 9/2018 | Mertz | H04B 10/07955 |

FOREIGN PATENT DOCUMENTS

| | | |
|---|---|---|
| WO | 0075721 | 12/2000 |
| WO | WO-2012073243 A1 | 6/2012 |
| WO | 2017019507 | 2/2017 |

OTHER PUBLICATIONS

Kaminov et al., Optical Fiber Telecommunications vol. VIB: Systems and Network, 2013, Academic Press, pp. 932-934 Year: (2013).*

Wikipedia, White Noise, 2017 (Year: 2017).*

Deshpande, Electron Devices & Circuits: Principles and Applications, 2008, Tata McGraw-Hill Education, pp. 125-126 (Year: 2008).*

Kakande et al., QPSK Phase and Amplitude Regeneration at 56 Gbaud in a Novel Idler-Free Non-Degenerate Phase Sensitive Amplifier, OSA, 2011 (Year: 2011).*

"U.S. Appl. No. 16/359,229, Non Final Office Action dated Sep. 30, 2019", 12 pgs.

"U.S. Appl. No. 16/359,234, Non Final Office Action dated Oct. 1, 2019", 12 pgs.

"U.S. Appl. No. 16/359,229, Response filed Dec. 30, 2019 to Non Final Office Action dated Sep. 30, 2019", 12 pgs.

Aziz, P. M., et al., "An Overview of Sigma-Delta Converters", IEEE Signal Processing Magazine, (Jan. 1996), 61-84.

Cvetkovic, Zoran, et al., "Single-Bit Oversampled A/D Conversion With Exponential Accuracy in the Bit Rate", IEEE Transactions on Information Theory, vol. 53, No. 11, (2007), 3979-3989.

Dabeer, Onkar, et al., "Signal Parameter Estimation Using 1-Bit Dithered Quantization", IEEE Transactions on Information Theory, vol. 52, No. 12 (Dec. 2006), 5389-5405.

Qi, Bing, et al., "High-speed quantum random number generation by measuring phase noise of a single-mode laser", Optics Letters / vol. 35, No. 3, (Feb. 2010), 312-314.

Roberts, Lawrence, "Picture Coding Using Pseudo-Random Noise", IRE Transactions on Information Theory, (1962), 145-154.

Rodenbeck, Christopher, et al., "Monobit Subsampler for Digital Downconversion in Pulse-Doppler Radar Applications", IEEE Transactions on Microwave Theory and Techniques, vol. 57, No. 5, (2009), 1036-1043.

Sinem, Ergen, et al., "Effect of Analog-to Digital Converter in Distributed Sampling for Sensor Networks", (2005), 8 pgs.

Valley, George C, "Photonic analog-to-digital converters", Optics Express , vol. 15, No. 5, [Online] Retrieved from the internet: <https://pdfs.semanticscholar.org/a868/e2d948b01cef975868088cf23flf0c2041f2.pdf>, (2007), 28 pgs.

Wang, Zhiyong, et al., "Monobit Digital Receivers for QPSK: Design, Performance and Impact of IQ Imbalances", arXiv:1202.6141v3 [cs.IT], (2013), 29 pgs.

Wannamaker, Rob, "A theory of Non-Subtractive Dither", IEEE Transactions on Signal Processing 48(2):499-516, (2000), 56 pgs.

"U.S. Appl. No. 16/359,229, Notice of Allowability dated May 1, 2020", 2 pgs.

"U.S. Appl. No. 16/359,229, Notice of Allowance dated Mar. 13, 2020", 9 pgs.

"U.S. Appl. No. 16/359,234, Notice of Allowability dated May 1, 2020", 2 pgs.

"U.S. Appl. No. 16/359,234, Notice of Allowance dated Mar. 13, 2020", 10 pgs.

"U.S. Appl. No. 16/359,234, Response filed Jan. 2, 2020 to Non Final Office Action dated Oct. 1, 2019", 13 pgs.

"U.S. Appl. No. 16/359,234, Notice of Allowability dated Jun. 1, 2020", 2 pgs.

"International Application Serial No. PCT/US2020/012547, International Search Report dated May 4, 2020", 5 pgs.

"International Application Serial No. PCT/US2020/012547, Written Opinion dated May 4, 2020", 7 pgs.

"International Application Serial No. PCT/US2020/023151, International Search Report dated Jun. 9, 2020", 4 pgs.

"International Application Serial No. PCT/US2020/023151, Written Opinion dated Jun. 9, 2020", 7 pgs.

Ajmal, T, et al., "Design of a 10Gbps Optical Burst mode DPSK Receiver for Data and Clock Recovery", EC0C2008, ECOC, Brussels, ECOC, Brussels Expo, Belgium, (Sep. 21, 2008), 2 pgs.

Malouin, Christian, et al., "Differential Phase-Shift Keying Receiver Design Applied to Strong Optical Filtering", Journal of Lightwave Technology, IEEE, USA, vol. 25, No. 11, (Nov. 1, 2007), 3536-3542.

(56) References Cited

OTHER PUBLICATIONS

Yamada, Yoshiaki, et al., "High-Level Fluctuation Tolerant Optical Receiver for Optical Packet Switch and WDM Cross-Connect", Journal of Lightwave Technology, IEEE, USA, vol. 16, No. 12, (Dec. 1, 1998), 2220-2227.

"International Application Serial No. PCT US2020 023158, International Search Report dated Jun. 12, 2020", 4 pgs.

"International Application Serial No. PCT US2020 023158, Written Opinion dated Jun. 12, 2020", 7 pgs.

Khilo, Anatol, "Photonic ADC: overcoming the bottleneck of electronic jitter", Optics Express, vol. 20, No. 4, (Feb. 13, 2012), 4454 pgs.

\* cited by examiner

PHOTONIC MONOBIT ANALOG-TO-DIGITAL CONVERTER USING COHERENT DETECTION

TECHNICAL FIELD OF THE DISCLOSURE

The present disclosure relates to analog-to-digital converters (ADCs). More specifically, the present disclosure relates to photonic monobit ADCs, such as photonic monobit ADCs using coherent detection. Some aspects of the present disclosure relate to multi-channel photonic monobit ADCs. Further aspects of the present disclosure relate to a photonic monobit communications receiver.

BACKGROUND OF THE DISCLOSURE

As communication systems evolve over time, digital data rates tend to increase. As a result, there is an ongoing effort to increase the speed and accuracy of analog-to-digital conversion to support the increase in communication rates.

High bandwidth and high spur-free dynamic range analog-to-digital conversion is a common desire across multiple domains but is difficult to achieve. With the advent of photonics, the analog-to-digital conversion can be improved beyond the electronic conversion by harvesting the photonics bandwidth and balancing the functional partition between electronics and photonics.

BRIEF DESCRIPTION OF THE DRAWINGS

Corresponding reference characters indicate corresponding parts throughout the several views. Elements in the drawings are not necessarily drawn to scale. The configurations shown in the drawings are merely examples and should not be construed as limiting the scope of the invention in any manner.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Techniques disclosed herein can be used to realize photonic ADCs with high spur-free dynamic range (SFDR) based on a monobit concept, based on dithering an input signal with uniform noise and using coherent detection. More specifically, a photonic monobit ADC can include an optical incoherent noise source to phase dither an optical waveform that is representative of a radio frequency (RF) waveform of interest. By mapping an incoming RF waveform (e.g., a complex baseband signal) into an optical phase and amplitude and combining with an optical high bandwidth incoherent noise source, the photonic interferometry can be utilized to detect dithered in-phase (I) and quadrature (Q) components using coherent detection, where the dithered I and Q signal components correspond to the input complex baseband signal. The dithered I and Q signal components can be further processed (e.g., using a limiter) to generate a digital signal representation of the input complex baseband signal. In this regard, by using photonic capabilities in monobit ADC technology, lower power consumption and better performance at the higher sampling rates can be achieved.

Figure 1:
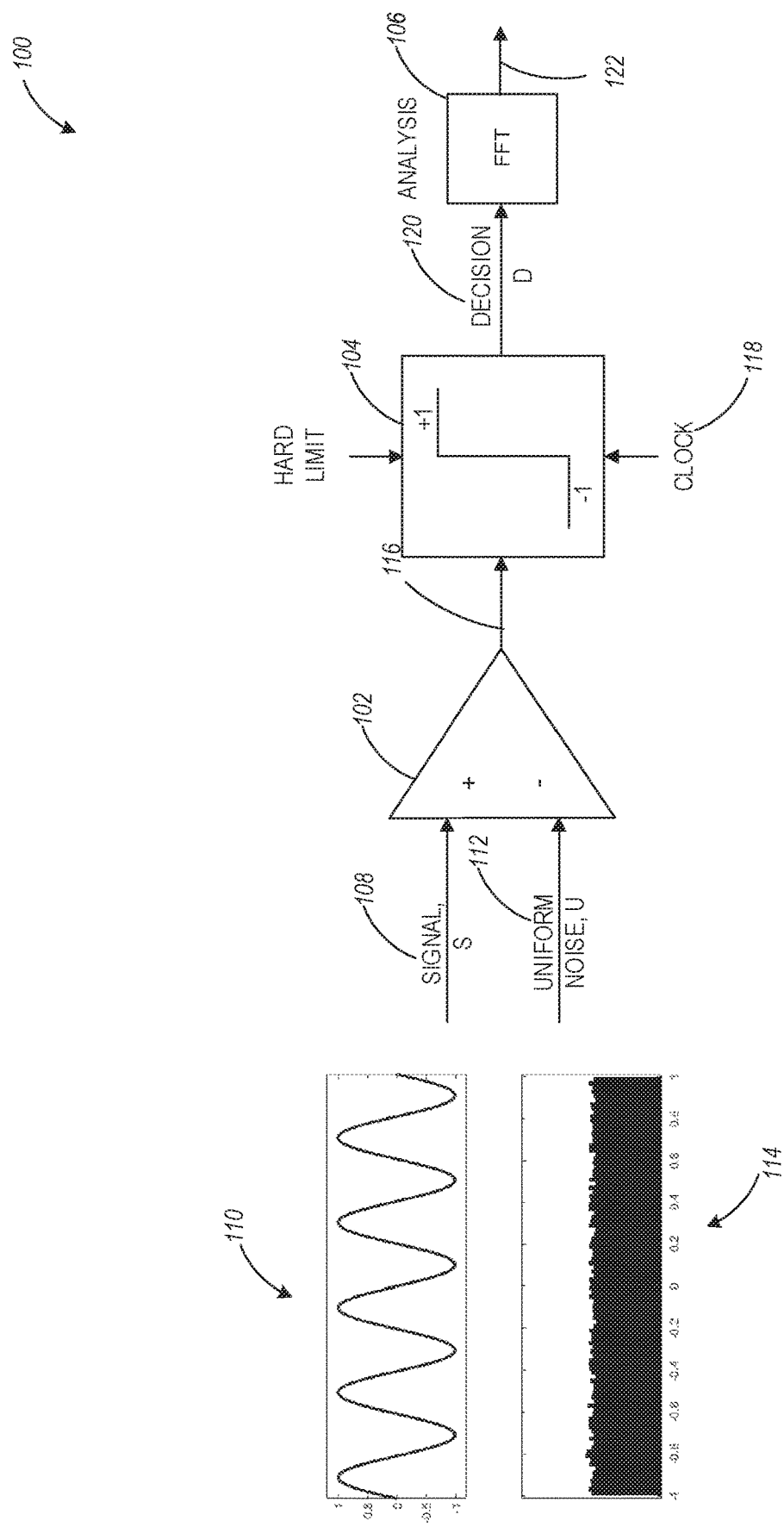
FIG. 1 illustrates a conceptual block diagram of a monobit ADC, in accordance with some aspects.

FIG. 1 illustrates a conceptual block diagram of a monobit ADC 100, in accordance with some aspects. Electronic monobit ADCs convert an analog signal to its digital representation based on dithering an input signal with uniform noise. Referring to FIG. 1, the monobit ADC 100 can include a comparator 102 and a limiter 104. The comparator 102 is configured to receive an analog input signal (S) 108 and a uniform noise signal (U) 112. The analog input signal 108 can have a signal profile as illustrated in graph 110, and the uniform noise signal 112 can have a noise distribution as illustrated in graph 114.

The comparator 102 compares the analog input signal 108 with the uniform noise signal 112 to generate a comparison result 116. The limiter 104 is configured to receive a clock signal 118 and the comparison result 116, and hard limit the comparison result to +1 (if the comparison result is positive indicating that signal 108 is greater than the noise) or −1 (if the comparison result is negative indicating that the noise is greater than signal 108). The limiter 104 outputs a decision signal (D) 120, with the expected value (or average) of the limiter output signal D 120 being a digital signal representation 122 of the analog input signal 108, after processing with a filter (e.g., in a digital signal processing block or a Fourier frequency transform (FFT) block such as FFT block 106).

One of the main limitations of analog-to-digital conversion at higher rates is the introduced spurs of undesired tones resulting from realization imperfections. A significant advantage of the monobit ADC architecture is the high SFDR resulting from the dithering (or applying uniform noise to) the input signal.

Figure 2:
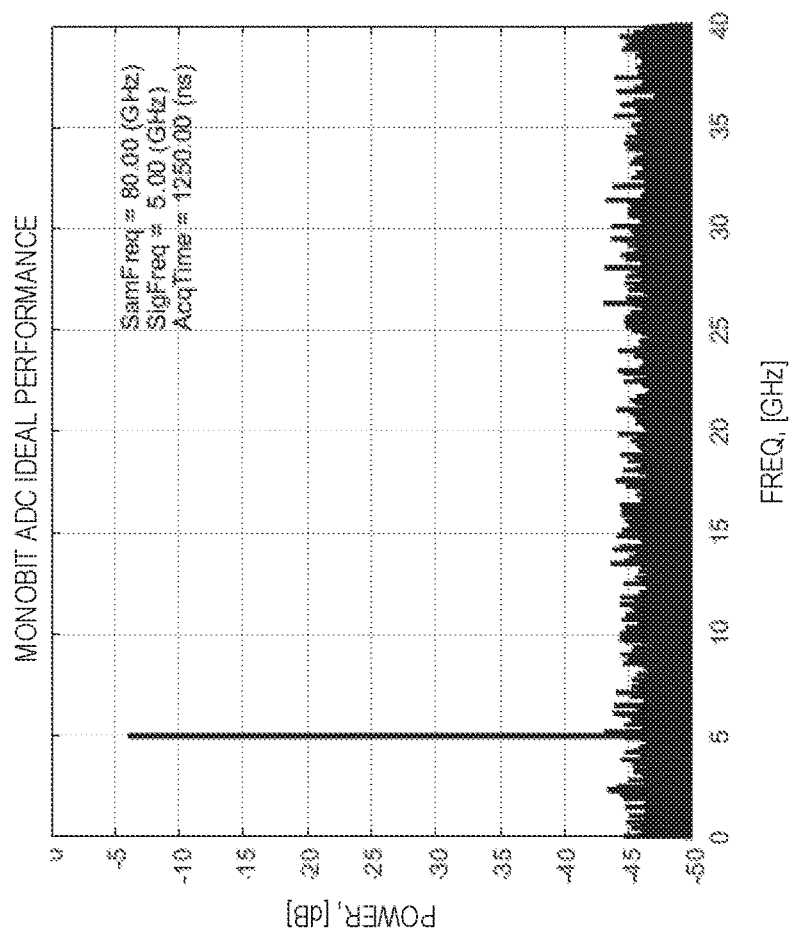
FIG. 2 is a graphical representation illustrating a frequency Fourier transform (FFT) magnitude of a tone based on the monobit ADC of FIG. 1.

FIG. 2 is a graphical representation 200 illustrating a frequency Fourier transform (FFT) magnitude of a tone based on the monobit ADC 100 of FIG. 1. FIG. 2 is illustrative of the spur free range of monobit conversion. More specifically, FIG. 2 illustrates the frequency and power profile of a tone at 5 GHz that is sampled at 80 GHz with an acquisition time of 1.25 μs. The spurs appear relatively at the same power level as illustrated by the FFT of the limiter output.

Some techniques for implementing electronic monobit conversion can rely on generating digital pseudo-random noise, which can consume a large portion of the ASIC power and can be a limiting factor as the sampling rates and signals increase. One of the advantages of photonics is its bandwidth and relative efficiency. In this regard, techniques disclosed herein can be used to realize a photonic monobit ADC, based on a modulator that modulates the electrical signal onto an optical carrier to be compared with an incoherent wide bandwidth noise source, as discussed hereinbelow.

Figure 3:
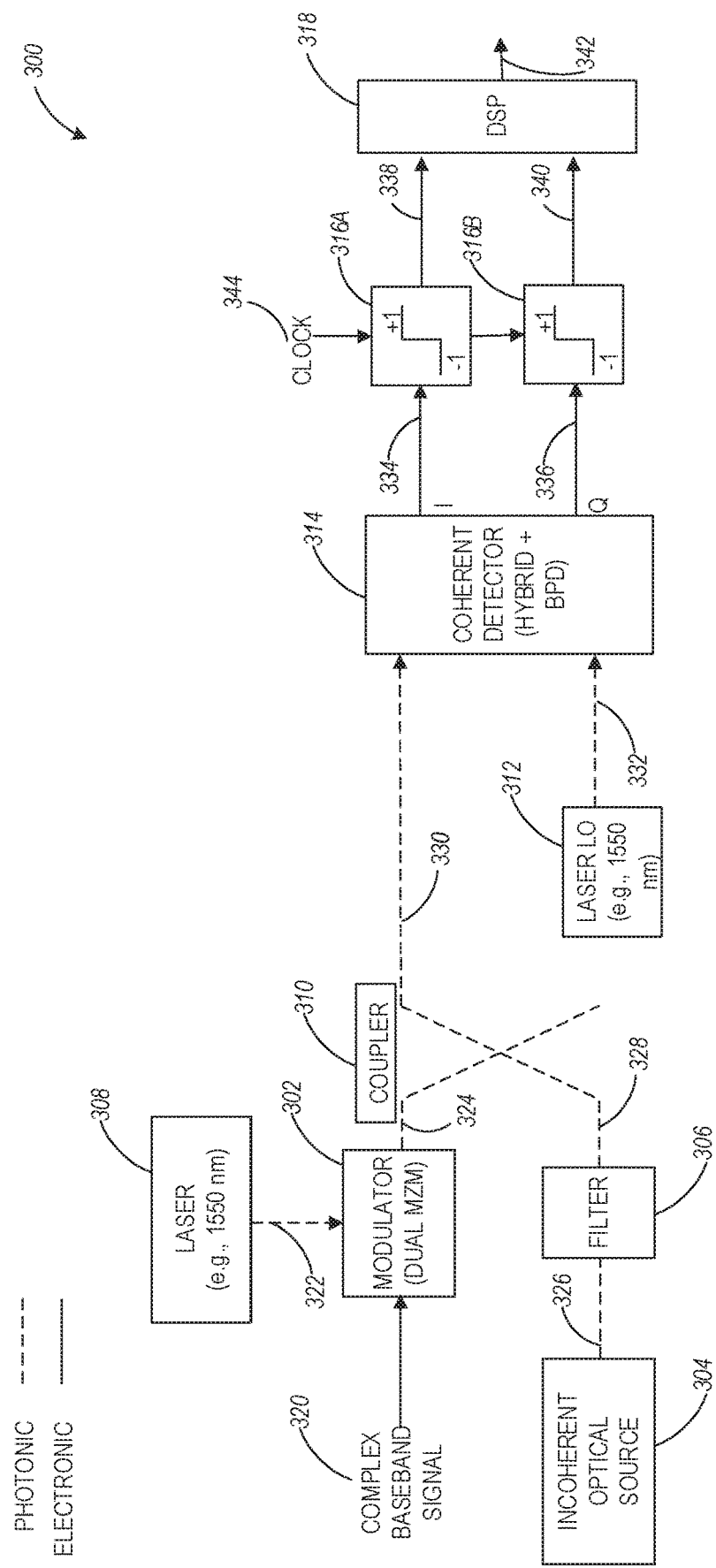
FIG. 3 is a block diagram of a photonic monobit ADC using coherent detection, in accordance with some aspects.

FIG. 3 is a block diagram of a photonic monobit ADC using coherent detection, in accordance with some aspects. Referring to FIG. 3, the photonic monobit ADC 300 can include a dual optical modulator 302, an incoherent optical source 304, a filter 306, a first optical signal generator 308, a coupler 310, a second optical signal generator 312, a coherent detector 314, limiters 316A and 316B, and a digital signal processor (DSP) 318.

Figure 4:
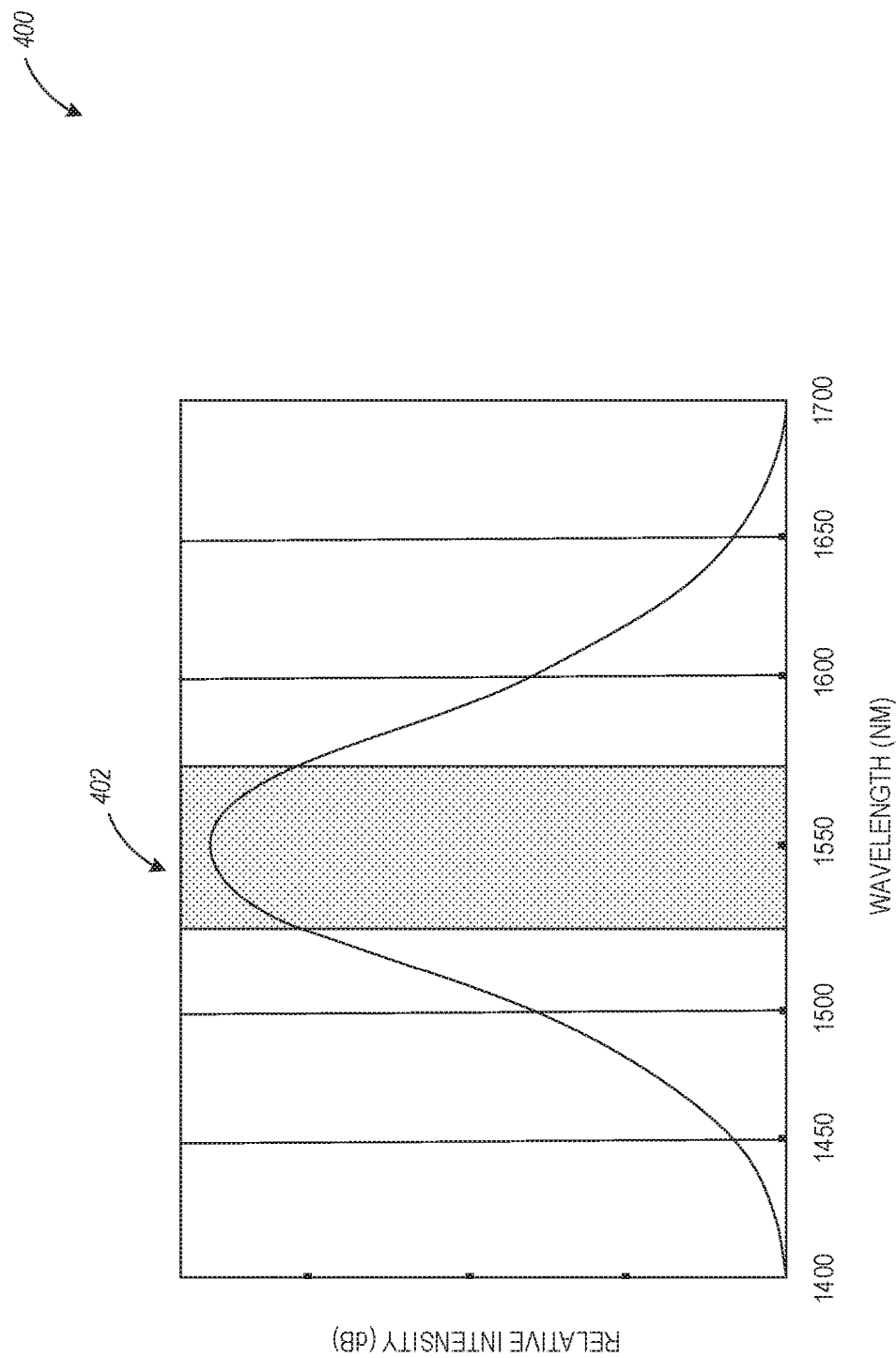
FIG. 4 is a graphical spectral representation of a noise signal from an incoherent optical source which can be used in connection with the ADC of FIG. 3.

The optical source 304 can be an incoherent signal source generating an optical or photonic noise signal 326, where the signal phases are random and uniformly distributed over the range of the signal, from sample to sample, with low correlation existing between any two samples. FIG. 4 is a graphical spectral representation 400 of a noise signal (e.g., 326) from the incoherent optical source 304 used in connection with the photonic monobit ADC 300. In some aspects, the optical source 304 can be an incoherent white light emitting diode (LED) source with high bandwidth, such as a bandwidth exceeding 1 THz, or an amplified spontaneous emissions (ASE) light source, or another type of optical noise source. As illustrated in FIG. 4, the noise signal 326 can be filtered so that a limited slice (e.g., 402) can be selected for dithering with another optical signal within the photonic monobit ADC 300.

The filter 306 can be configured to filter the optical noise signal 326 generated by the incoherent optical source 304, to obtain an optical filtered noise signal 328. In some aspects, the filter 306 can be a 1 nm filter that can be configured to generate a 125 GHz optical noise signal slice with a random phase samples. In some aspects, the optical filtered noise signal 328 can be centered at 1550 nm wavelength as shown in FIG. 4, or it can be centered at another wavelength.

The dual optical modulator 302 may comprise suitable circuitry, logic, interfaces and/or code and is configured to receive an input optical signal 322 from the first optical signal generator 308 and an electronic input complex baseband signal 320, to generate an optical modulated signal 324. The input complex baseband signal 320 can include an in-phase (I) signal component and a quadrature (Q) signal component. In some aspects, the first optical signal generator 308 can be a laser signal generator and the input optical signal 322 can be a laser signal. In some aspects, the first optical signal generator 308 can be a 1550 nm laser or another wavelength laser. The dual optical modulator 302 is configured to phase and/or amplitude modulate the input complex baseband signal 320 onto the input optical signal 322 to generate the optical modulated signal 324 (i.e., the phase and amplitude of the optical modulated signal 324 correspond to the signal phase and amplitude of the input complex baseband signal 320). In some aspects, the dual optical modulator 302 can include a dual Mach-Zehnder modulator (MZM) that can be used in place of a phase modulator, which can further contribute to improving the effectiveness of the photonic monobit ADC 300 by removing the harmonics inherent in the phase modulation process.

The coupler 310 is configured to couple the optical modulated signal 324 and the optical filtered noise signal 328 from the incoherent optical source 304 and the filter 306, to generate an optical coupled signal 330 (e.g., appearing at the upper arm of the coupler 310 in FIG. 3, with the lower arm of the coupler not being used). As used herein, the optical coupled signal 330 can also be referred to as a dithered optical signal 330 (or a dithered signal 330).

The coherent detector 314 comprises suitable circuitry, logic, interfaces and/or code, and is configured to perform coherent detection of I and Q signal components within the optical coupled signal 330. In some aspects, the coherent detector 314 can include a hybrid circuit (e.g., a plurality of couplers) followed by a balanced photodetector. The coherent detector 314 is configured to receive a reference optical signal 332 from the second optical signal generator 312 and the optical coupled signal 330, and coherently detect a dithered I signal component 334 and a dithered Q signal component 336 corresponding to the input complex baseband signal 320. More specifically, the coherent detector 314 can perform coherent detection of the I and Q signal components 334 and 336 within the optical coupled signal 330 using the reference optical signal 332.

Even though FIG. 3 illustrates two separate optical signal generators 308 and 312, the disclosure is not limited in this regard and a single optical signal generator (e.g., a single laser source) can be used to generate optical signals 322 and 332 (which can be laser signals). In some aspects, optical signals 322 and 332 can be the same laser signal.

The limiters 316A and 316B may comprise suitable circuitry, logic, interfaces and/or code and are configured to receive the dithered I signal component 334 and the dithered Q signal component 336, respectively, and generate a complex decision signal (e.g., including an I decision signal component 338 and a Q decision signal component 340) corresponding to the sign of the received signal components 334/336 based on the clock signal 344. In this regard, the limiters 316A/316B are threshold devices that limit the input signal to either +1 (if the input is positive) or −1 (if the input is negative), with the clock signal 344 triggering when the comparison occurs. The triggers can occur at the clock rate, which corresponds to the sample rate of an ADC. The mechanism of the trigger can be, but not limited to, zero-crossing for the clock, a rising edge, or a falling edge of a clock signal. The complex decision signals (338 and 340) can be further processed (e.g., by filtering, signal reconstruction, and/or other signal processing) performed by the DSP 318, to generate an output digital signal 342 representative of the input complex baseband signal 320.

Figure 5:
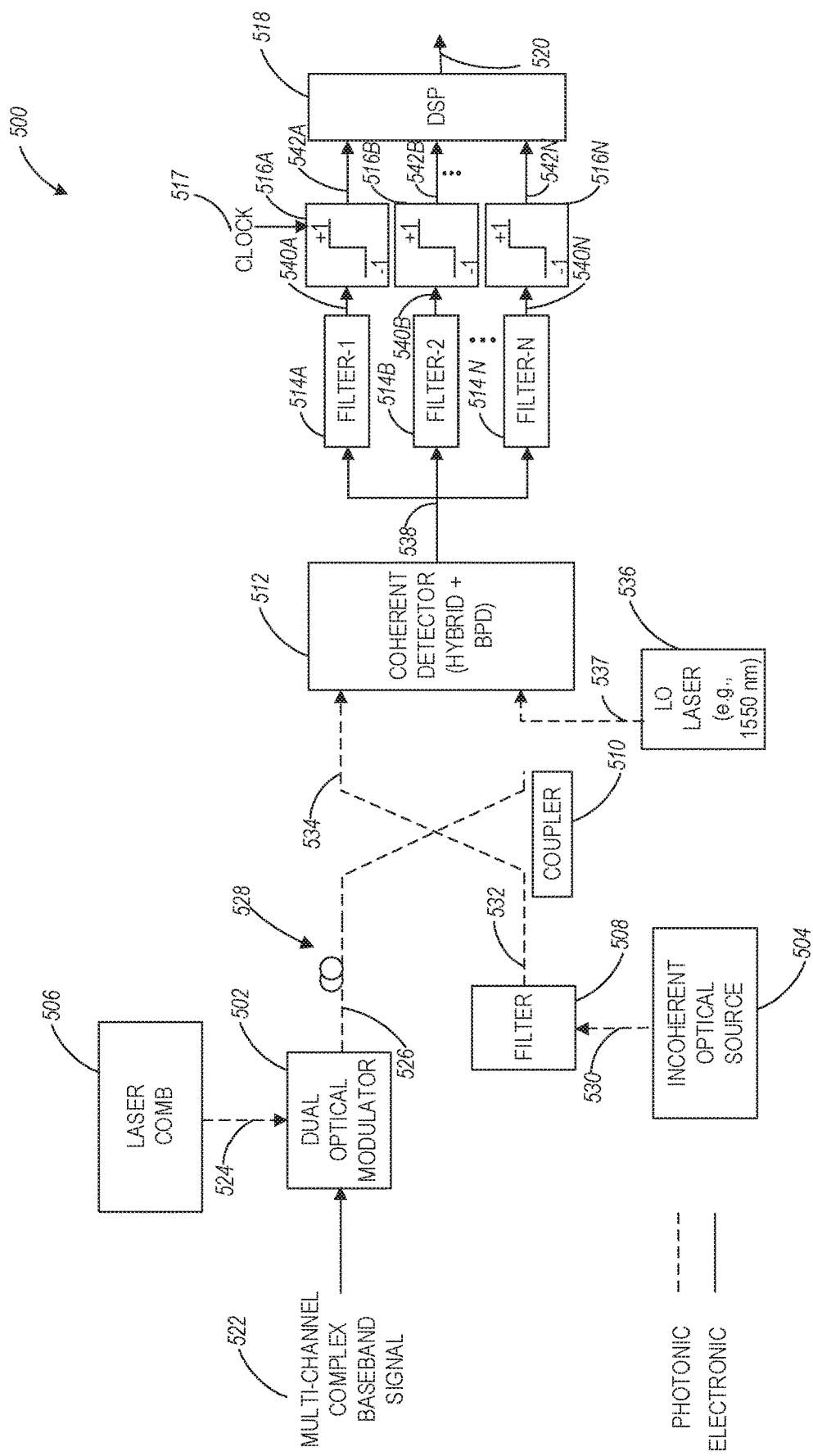
FIG. 5 is a block diagram of a multi-channel photonic monobit ADC using a dual optical modulator, in accordance with some aspects.

FIG. 5 is a block diagram of a multi-channel photonic monobit ADC using a dual optical modulator, in accordance with some aspects. Referring to FIG. 5, the multi-channel photonic monobit ADC 500 can include a dual optical modulator 502, an incoherent optical source 504, a filter 508, a comb signal generator 506, a coupler 510, a coherent detector 512, a local oscillator (LO) laser 536, filters 514A, 514B, . . . , 514N, limiters 516A, 516B, . . . , 516N, and a digital signal processor (DSP) 518.

The optical source 504 can be an incoherent signal source generating an optical or photonic noise signal 530, where the signal phases are random and uniformly distributed over the range of the signal, from sample to sample, with low correlation existing between any two samples. In some aspects, the optical source 504 can be an incoherent white light emitting diode (LED) source with high bandwidth, such as a bandwidth exceeding 1 THz, an amplified spontaneous emissions (ASE) light source, or another type of optical noise source. As illustrated in FIG. 5, the noise signal 530 can be filtered so that a limited slice can be selected for dithering with another optical signal within the multi-channel photonic monobit ADC 500.

The filter 508 can be configured to filter the optical noise signal 530 generated by the incoherent optical source 504, to obtain an optical filtered noise signal 532. In some aspects, the filter 508 can be a 1 nm filter that can be configured to generate a 125 GHz optical noise signal slice with a random phase samples. In some aspects, the optical filtered noise signal 532 can be centered at 1550 nm wavelength as shown in FIG. 4, or at another wavelength.

The dual optical modulator 502 may comprise suitable circuitry, logic, interfaces and/or code and is configured to receive an input optical comb signal 524 from the comb signal generator 506 and an electronic input multi-channel complex baseband signal 522, to generate a multi-channel optical modulated signal 526. The input multi-channel complex baseband signal 522 can include an in-phase (I) signal component and a quadrature (Q) signal component of a multi-channel signal. In some aspects, the input multichannel complex baseband signal 522 can include an orthogonal frequency division multiplexing (OFDM) waveform or another type of multi-channel waveform. In some aspects, the comb signal generator 506 can be a laser comb signal generator and the input optical comb signal 524 can be a laser comb signal.

The dual optical modulator 502 is configured to phase and/or amplitude modulate the input multi-channel complex baseband signal 522 onto the input optical comb signal 524 to generate the multi-channel optical modulated signal 526 (i.e., the phase and/or amplitude of the multi-channel optical modulated signal 526 correspond to the signal phase and/or amplitude of the input multi-channel complex baseband signal 522). In some aspects, the dual optical modulator 502 is configured to phase modulate the input multichannel complex baseband signal 522 onto the input optical comb signal 524 to generate the multi-channel optical modulated signal 526.

In some aspects, the dual optical modulator 502 can include a dual Mach-Zehnder modulator (MZM) that can be used in place of a phase modulator, which can further contribute to improving the effectiveness of the multi-channel photonic monobit ADC 500 by removing the harmonics inherent in the phase modulation process.

The multi-channel optical modulated signal 526 can be communicated to the coupler 510 via a fiber transmission line 528. The coupler 510 is configured to couple the multi-channel optical modulated signal 526 and the optical filtered noise signal 532 from the incoherent optical source 504 and the filter 508, to generate an optical coupled signal 534. The optical coupled signal 534 and an LO optical signal 537 from the LO laser 536 are communicated as inputs to the coherent detector 512. As used herein, the optical coupled signal 534 can also be referred to as a dithered optical signal 534 (or a dithered signal 534).

The coherent detector 512 comprises suitable circuitry, logic, interfaces and/or code, and is configured to perform coherent detection of I and Q signal components within the optical coupled signal 534. In some aspects, the coherent detector 512 can include a hybrid circuit (e.g., a plurality of couplers) followed by a balanced photodetector. The coherent detector 512 is configured to receive the optical coupled signal 534 and the LO optical signal 536, and coherently detect a dithered complex multi-channel signal 538. The dithered complex multi-channel signal 538 can correspond to the multi-channel optical modulated signal 526 dithered based on the optical noise signal from the incoherent optical source 504. In some aspects, the coherent detector 512 can perform coherent detection of I and Q signal components within the optical coupled signal 534 or 536. The dithered complex multi-channel signal 538 is communicated as an input to filters 514A, 514B, . . . , 514N, where each filter can be tuned to a corresponding center frequency of a communication channel of a plurality of communication channels associated with the multi-channel complex baseband signal 522. Filters 514A, 514B, . . . , 514N can filter the dithered complex multi-channel signal 538 to generate corresponding dithered complex signals 540A, 540B, . . . , 540N. The dithered complex signals 540A, 540B, . . . , 540N correspond to a plurality of communication channels associated with the input multi-channel complex baseband signal 522. The dithered complex signals 540A, 540B, . . . , 540N are communicated as inputs to corresponding limiters 516A, 516B, . . . , 516N.

The limiters 516A, 516B, . . . , 516N comprise suitable circuitry, logic, interfaces and/or code and are configured to receive the dithered complex signals 540A, 540B, . . . , 540N, respectively, and generate complex decision signals 542A, 542B, . . . , 542N (e.g., decision signal including an I decision signal component and a Q decision signal component) corresponding to the sign of the dithered complex signals 540A, . . . , 540N based on the clock signal 517. In this regard, the limiters 516A, . . . , 516N are threshold devices that limit the input signal to either +1 (if the input is positive) or −1 (if the input is negative), with the clock signal 517 triggering when the comparison occurs. The triggers can occur at the clock rate, which corresponds to the sample rate of an ADC. The mechanism of the trigger can be, but not limited to, zero-crossing for the clock, a rising edge, or a falling edge of a clock signal. The complex decision signals 542A, 542B, . . . , 542N can be further processed (e.g., by filtering, signal reconstruction, and/or other signal processing) performed by the DSP 518, to generate an output digital signal 520 representative of the input multi-channel complex baseband signal 522.

Figure 6A:
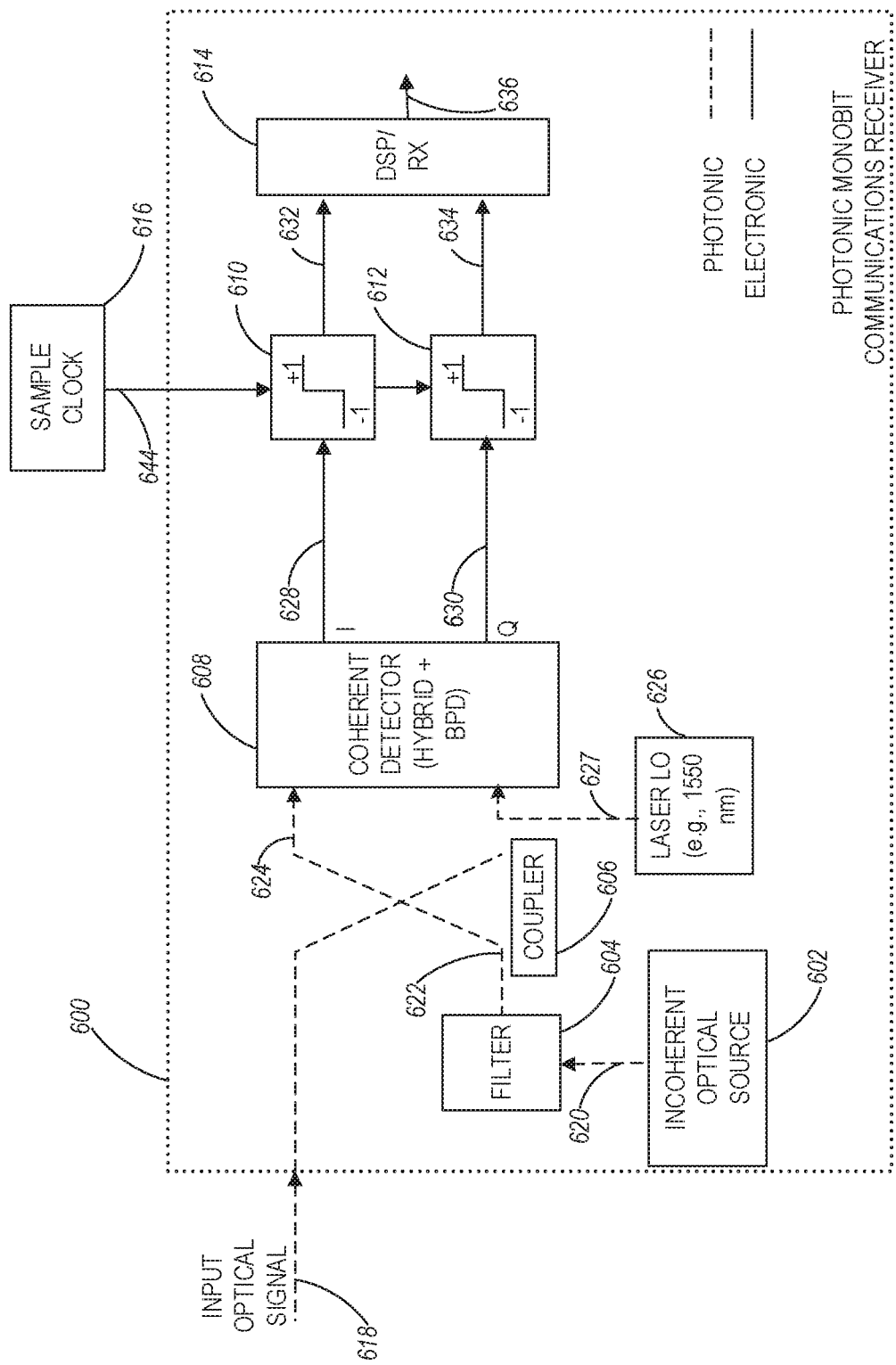
FIG. 6A is a block diagram of a photonic monobit communications receiver, in accordance with some aspects.

FIG. 6A is a block diagram of a photonic monobit communications receiver 600, in accordance with some aspects. Referring to FIG. 6A, the photonic monobit communications receiver 600 can include an incoherent optical source 602, a filter 604, a coupler 606, a local oscillator (LO) laser 626, a coherent detector 608, limiters 610 and 612, and the DSP 614.

The optical source 602 can be an incoherent signal source generating an optical or photonic noise signal 620, where the signal phases are random and uniformly distributed over the range of the signal, from sample to sample, with low correlation existing between any two samples. In some aspects, the optical source 602 can be an incoherent white light emitting diode (LED) source with a high bandwidth, such as a bandwidth exceeding 1 THz, an amplified spontaneous emissions (ASE) light source, or another type of optical noise source. As illustrated in FIG. 6A, the optical noise signal 620 can be filtered so that a limited slice can be selected for dithering with another optical signal within the photonic monobit communications receiver 600 (e.g., by using the coupler 606 to couple the filtered optical signal with another input optical modulated signal such as signal 618).

The filter 604 can be configured to filter the optical noise signal 620 generated by the incoherent optical source 602, to obtain an optical filtered noise signal 622. In some aspects, the filter 604 can be a 1 nm filter that can be configured to generate a 125 GHz optical noise signal slice with a random phase samples. In some aspects, the optical filtered noise signal 622 can be centered at 1550 nm wavelength as shown in FIG. 4, or at another wavelength.

The coupler 606 is configured to couple an input optical modulated signal 618 and the optical filtered noise signal 622 from the incoherent optical source 602 and the filter 604, to generate an optical coupled signal 624. The optical coupled signal 624 and an LO optical signal 627 generated by the LO laser 626 are communicated as inputs to the coherent detector 608. As used herein, the optical coupled signal 624 can also be referred to as a dithered optical signal 624 (or a dithered signal 624).

In some aspects, the input optical modulated signal 618 can include a complex modulated optical signal, such as a phase and/or amplitude complex modulated optical signal. The complex modulated optical signal can correspond to an analog signal such as a complex baseband signal or another type of analog signal. Example generation of the input optical modulated signal 618 is illustrated in FIG. 6B.

The coherent detector 608 comprises suitable circuitry, logic, interfaces and/or code, and is configured to perform coherent detection of dithered I and Q signal components within the optical coupled signal 624. In some aspects, the coherent detector 608 can include a hybrid circuit (e.g., a plurality of couplers) followed by a balanced photodetector. The coherent detector 608 is configured to receive the optical coupled signal 624 and the LO optical signal 627, and coherently detect a dithered complex multi-channel signal. The I signal component 628 and the Q signal component 630 correspond to I and Q signal components of the input optical modulated signal 618 dithered based on the optical noise signal from the incoherent optical source 602.

The dithered I and Q signal components 628 and 630 are communicated as inputs to corresponding limiters 610 and 612. The limiters 610 and 612 comprise suitable circuitry, logic, interfaces and/or code and are configured to receive the dithered I and Q signal component 628 and 630, respectively, and generate complex decision signals such as an I decision signal component 632 and a Q decision signal component 634 corresponding to the sign of the received signal components 628/630 based on the sample clock signal 644 from the sample clock generator 616. In this regard, the limiters 610/612 are threshold devices that limit the input signal to either +1 (if the input is positive) or −1 (if the input is negative), with the clock signal 644 triggering when the comparison occurs. The triggers can occur at the clock rate, which corresponds to the sample rate of an ADC. The mechanism of the trigger can be zero-crossing for the clock, a rising edge, or a falling edge of a clock signal. The decision signal components 632 and 634 can be further processed (e.g., by filtering, signal reconstruction, and/or other signal processing) performed by the DSP 614 or another receiver processing block within the photonic monobit communications receiver 600, to generate a digital bitstream 636 that corresponds to the input optical modulated signal 618.

Figure 6B:
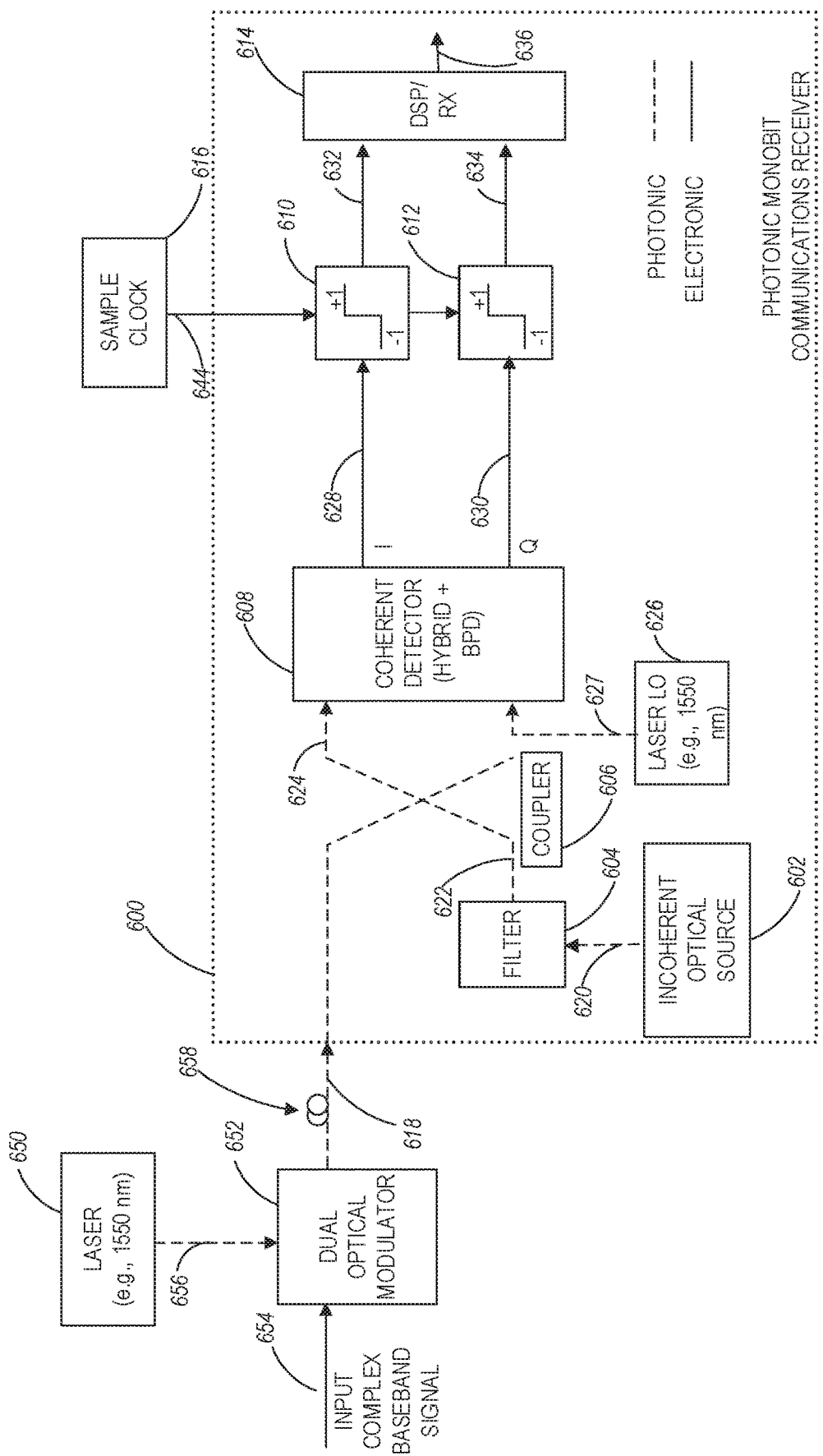
FIG. 6B is a block diagram of the photonic monobit communications receiver of FIG. 6A using a complex signal modulator, in accordance with some aspects.

FIG. 6B is a block diagram of the photonic monobit communications receiver of FIG. 6A using a complex signal modulator, in accordance with some aspects. More specifically, FIG. 6B illustrates further details regarding the generation of the input optical modulated signal 618. For example, an electronic complex baseband signal 654 can be received by a dual optical modulator 652 coupled to the photonic monobit communications receiver 600 via a fiber transmission line 658.

The dual optical modulator 652 may comprise suitable circuitry, logic, interfaces and/or code and is configured to receive an input optical signal 656 from the optical signal generator 650 and the input complex baseband signal 654, to generate the optical modulated signal 618. The input complex baseband signal 654 can include an in-phase (I) signal component and a quadrature (Q) signal component of a complex signal. In some aspects, the optical signal generator 650 can be a laser signal generator and the input optical signal 656 can be a laser signal.

The dual optical modulator 652 is configured to phase and amplitude modulate (or only phase modulate) the input complex baseband signal 654 onto the input optical signal 656 to generate the optical modulated signal 618 (i.e., the phase and amplitude of the optical modulated signal 618 correspond to the signal phase and amplitude of the input complex baseband signal 654). In some aspects, the dual optical modulator 652 is configured to phase modulate the input complex baseband signal 654 onto the input optical signal 656 to generate the optical modulated signal 618.

In some aspects, the dual optical modulator 652 can include a dual Mach-Zehnder modulator (MZM) that can be used in place of a phase modulator, which can further contribute to improving the effectiveness of the photonic monobit communications receiver 600 by removing the harmonics inherent in the phase modulation process.

Figure 7:
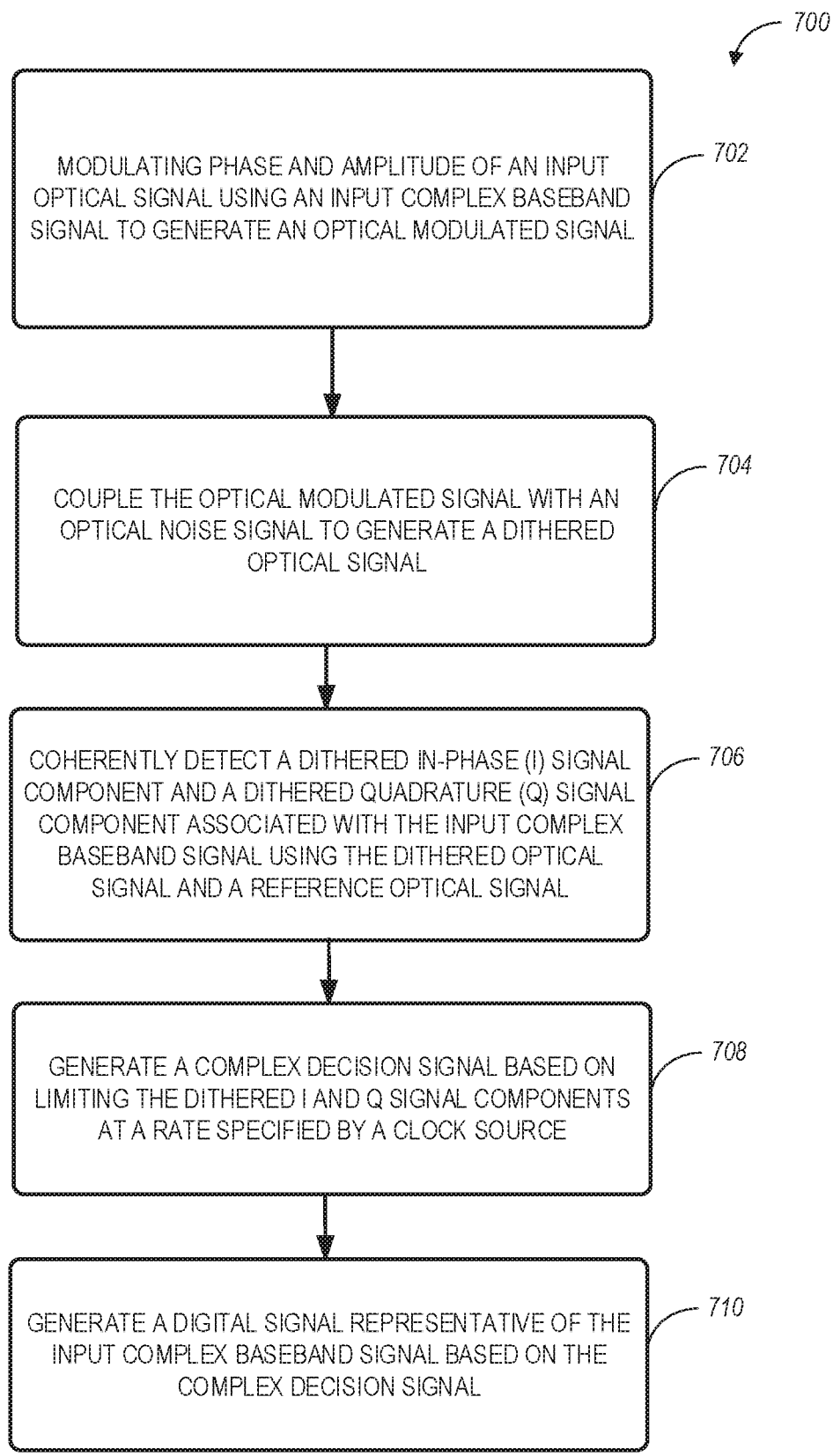
FIG. 7 illustrates generally a flowchart of example functionalities which can be performed in connection with analog-to-digital conversion, in accordance with some aspects.

FIG. 7 illustrates generally a flowchart of example functionalities which can be performed in connection with analog-to-digital conversion, in accordance with some aspects. Referring to FIG. 7, the method 700 includes operations 702, 704, 706, 708, and 710. By way of example and not limitation, the method 700 is described as being performed by one or more of the components of the photonic monobit ADC 300 of FIG. 3. At operation 702, phase and/or amplitude of an input optical signal can be modulated using the electronic input complex baseband signal to generate an optical modulated signal. For example, phase and amplitude of an input optical signal 322 generated by the optical signal source 308 can be modulated by the modulator 302 based on the complex baseband signal 320 to generate an optical modulated signal 324.

At operation 704, the optical modulated signal 324 is coupled with an optical noise signal to generate a dithered optical signal. For example, coupler 310 can couple the optical modulated signal 324 with the optical noise signal 328 generated by filter 306, to output a dithered optical signal 330.

At operation 706, a dithered in-phase (I) signal component and a dithered quadrature (Q) signal component associated with the input complex baseband signal are coherently detecting using the dithered optical signal and a reference optical signal. For example, the coherent detector 314 can perform coherent detection of the dithered optical signal 330 using the reference optical signal 332 to generate a dithered I signal component 334 and a dithered Q signal component 336 associated with the input complex baseband signal 320.

At operation 708, a complex decision signal is generated based on limiting the dithered I and Q signal components. For example, the limiters 316A and 316B generate the I decision signal component 338 and the Q decision signal component 340, respectively, of the complex decision signal by limiting the dithered signal components 334 and 336. In some aspects, the complex decision signal is generated based on limiting the dithered I and Q signal components at a rate specified by a clock signal, such as the clock signal 344.

At operation 710, a digital signal representative of the input complex baseband signal is generated based on the complex decision signal. For example, the DSP 318 generates the digital signal 342 using the I decision signal component 338 and the Q decision signal component 340, where the digital signal 342 is representative of the input complex baseband signal 320.

Figure 8:
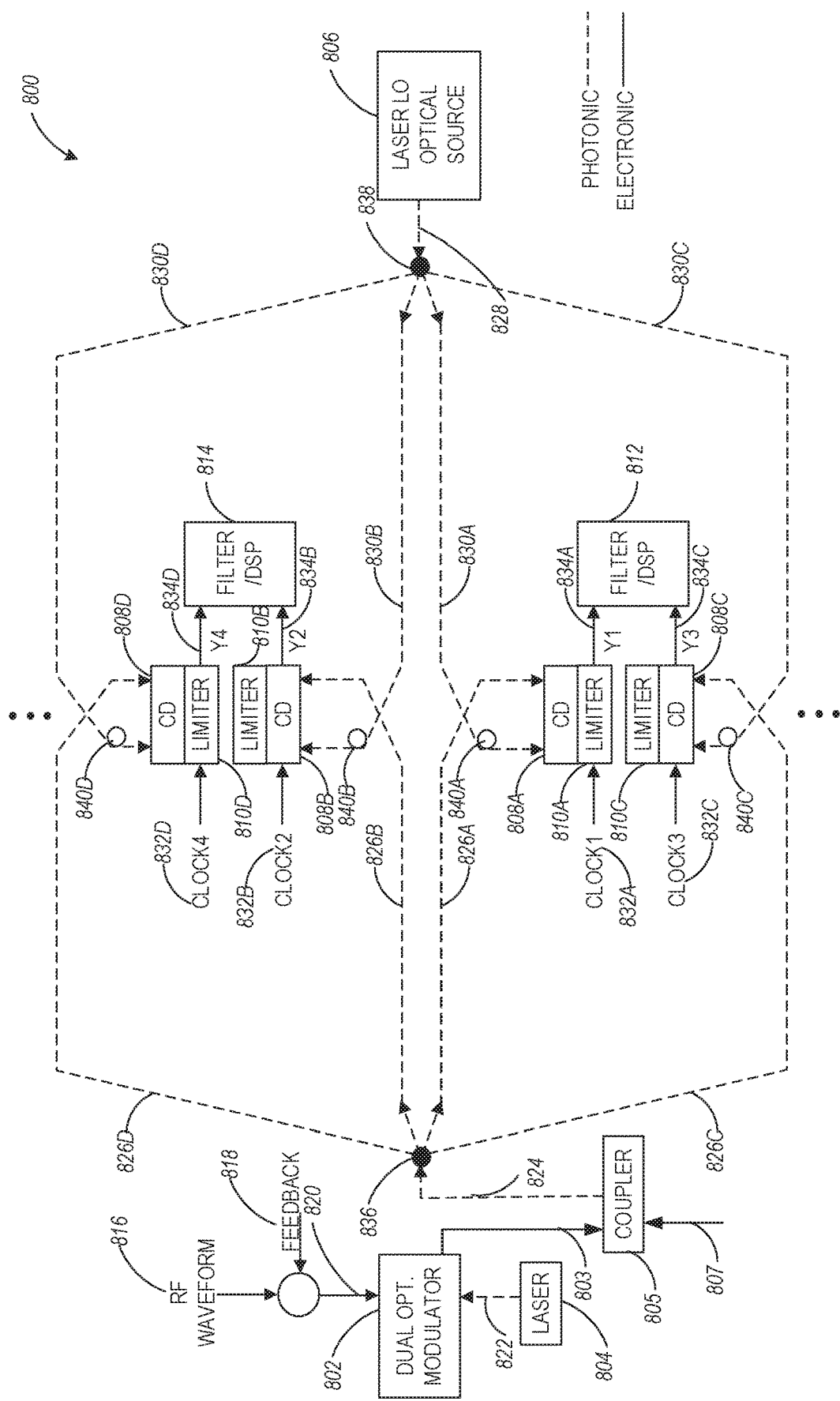
FIG. 8 is a block diagram of a photonic monobit ADC using coherent detection and signal splitting, in accordance with some aspects.

FIG. 8 is a block diagram of a photonic monobit ADC using coherent detection and signal splitting, in accordance with some aspects. Referring to FIG. 8, the photonic monobit ADC 800 can include a dual optical modulator 802, a laser light source 804, a laser local oscillator (LO) optical source 806, a plurality of coherent detectors (CDs) (e.g., 808A, 808B, 808C, and 808D), a plurality of limiters (e.g., 810A, 810B, 810C, and 810D), DSP circuits 812 and 814, photonic signal splitters 836 and 838, and a plurality of delay circuits (e.g., 840A, 840B, 840C, and 840D). The functionality of the circuits illustrated in FIG. 8 in connection with photonic monobit ADC 800 can be similar to corresponding functionalities of the same circuits illustrated in connection with the photonic monobit ADC 300 in FIG. 3.

In operation, an input analog signal 816 and an optical signal 822 generated by laser light source 804 can be communicated to the dual optical modulator 802. The dual optical modulator 802 can generate a modulated optical signal 803, which is coupled with an optical filtered noise signal 807 by coupler 805 to generate an optical coupled signal 824. The optical filtered noise signal 807 can be generated similarly to signal 326 in FIG. 3.

The optical coupled signal 824 can be split by splitters 836 into optical coupled signals 826A, 826B, 826C, and 826D for processing by the corresponding CDs 808A, 808B, 808C, and 808D. The laser LO optical source 806 can generate a reference optical signal 828 which can be split by splitters 838 into reference optical signals 830A, 830B, 830C, and 830D, which may be delayed by delay circuits 840A, 840B, 840C, and 840D prior to processing by the CDs 808A, 808B, 808C, and 808D. The limiters 810A, 810B, 810C, and 810D can use corresponding clock signals 832A, 832B, 832C, and 832D together with the detected phase signal output from the BPDs 808A-808D, to generate digital signals 834A, 834B, 834C, and 834D corresponding to the input analog signal 816. The digital signals 834A, 834B, 834C, and 834D can be further processed by the DSP circuits 814 and 812.

Even though FIG. 8 illustrates a photonic monobit ADC 800 that includes splitters 836 and 838 splitting an optical coupled signal into four separate optical coupled signals for processing by four separate CD/limiter processing chains, the disclosure is not limited in this regard and the optical coupled signals 824 and 828 can be split into a different number of signals (e.g., a multiple of 4) for processing by a corresponding number of CD/limiter/DSP processing chains.

In some aspects, the photonic monobit ADC 800 can implement Σ-Δ processing functionalities. In this regard, the DSP circuits 812 and 814 can generate feedback 818 which can be combined with the input analog signal 816 to generate a combined signal 820 prior to communication to the dual optical modulator 802 in connection with the Σ-Δ processing functionalities.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus the following claims are hereby incorporated into the Detailed Description, with each claim standing on its own as a separate aspect.

What is claimed is:

1. A photonic monobit analog-to-digital converter, comprising:
    an optical source configured to generate an optical noise signal, the optical noise signal comprising random signal phases that are uniformly distributed over a pre-determined range of the optical noise signal;
    a dual optical modulator configured to modulate phase and amplitude of an input complex baseband signal onto an input optical signal to generate an optical modulated signal;
    a coupler configured to couple the optical modulated signal with the optical noise signal to generate a dithered optical signal, the dithered optical signal having a spur-free dynamic range (SFDR) based on the uniformly distributed random signal phases of the optical noise signal;
    a coherent detector configured to coherently detect a dithered in-phase (I) signal component and a dithered quadrature (Q) signal component associated with the input complex baseband signal using the dithered optical signal and a reference optical signal;
    a limiter configured to output a complex decision signal based on the dithered I and Q signal components; and
    a digital signal processing (DSP) circuit configured to generate a digital signal representative of the input complex baseband signal based on the complex decision signal.

2. The photonic monobit analog-to-digital converter of claim 1, wherein the optical source is a white light emitting diode (LED) source or an amplified spontaneous emissions (ASE) light source with a bandwidth exceeding a bandwidth of a signal of interest.

3. The photonic monobit analog-to-digital converter of claim 1, further comprising:
a filter configured to generate a filtered optical noise signal using the optical noise signal, wherein the coherently detected I and Q signal components are dithered based on the filtered optical noise signal.

4. The photonic monobit analog-to-digital converter of claim 3, wherein the filtered optical noise signal comprises a bandwidth exceeding a bandwidth of a signal of interest.

5. The photonic monobit analog-to-digital converter of claim 1, further comprising:
a laser light source configured to generate the input optical signal.

6. The photonic monobit analog-to-digital converter of claim 5, wherein the laser light source is further configured to generate the reference optical signal.

7. The photonic monobit analog-to-digital converter of claim 5, further comprising:
a second laser light source coupled to the coherent detector and configured to generate the reference optical signal, wherein the second laser light source is a local oscillator optical source.

8. The photonic monobit analog-to-digital converter of claim 5, wherein the laser light source is a 1550 nm laser light source or a light source of a pre-configured wavelength that is different from 1550 nm.

9. The photonic monobit analog-to-digital converter of claim 1, wherein the coherent detector comprises a hybrid circuit coupled to a balanced photodetector, the hybrid circuit configured to receive the coupled signal and the reference optical signal.

10. The photonic monobit analog-to-digital converter of claim 1, wherein the limiter comprises a first limiter configured to generate an I signal component of the complex decision signal based on the dithered I signal component, and a second limiter configured to generate a Q signal component of the complex decision signal based on the dithered Q signal component.

11. The photonic monobit analog-to-digital converter of claim 1, wherein the dual optical modulator is a dual Mach-Zehnder modulator (MZM).

12. A method for generating a digital signal representative of an input complex baseband signal, the method comprising:
modulating phase and amplitude of an input optical signal using the input complex baseband signal to generate an optical modulated signal;
coupling the optical modulated signal with an optical noise signal to generate a dithered optical signal, the optical noise signal comprising random signal phases that are uniformly distributed over a pre-determined range of the optical noise signal, and the dithered optical signal having a sour free dynamic range (SFDR) based on the uniformly distributed random signal phases of the optical noise signal;
coherently detecting a dithered in-phase (I) signal component and a dithered quadrature (Q) signal component associated with the input complex baseband signal using the dithered optical signal and a reference optical signal;
generating a complex decision signal based on limiting the dithered I and Q signal components; and generating a digital signal representative of the input complex baseband signal based on the complex decision signal.

13. The method of claim 12, further comprising:
generating a filtered optical noise signal using the optical noise signal, wherein the coherently detected I and Q signal components are dithered based on the filtered optical noise signal.

14. The method of claim 12, wherein generating the complex decision signal further comprises:
generating an I signal component of the complex decision signal based on the dithered I signal component; and
generating a Q signal component of the complex decision signal based on the dithered Q signal component.

15. The method of claim 14, further comprising:
generating the digital signal representative of the input complex baseband signal based on the I and Q signal components of the complex decision signal.

16. The method of claim 12, wherein the detecting comprises:
coherently detecting the dithered I signal component and the dithered Q signal component associated with the input complex baseband signal using the dithered optical signal and the input optical signal.

17. A photonic monobit analog-to-digital converter, comprising:
an optical source configured to generate an optical noise signal, the optical noise signal comprising random signal phases that are uniformly distributed over a pre-determined range of the optical noise signal;
a filter configured to generate a filtered noise signal using the generated optical noise signal;
a dual optical modulator configured to modulate phase and amplitude of an input complex baseband signal onto an input optical signal to generate an optical modulated signal;
a coupler configured to couple the optical modulated signal with the filtered noise signal to generate a dithered optical signal, the dithered optical signal having a spur-free dynamic range (SFDR) based on the uniformly distributed random signal phases of the optical noise signal;
a coherent detector configured to coherently detect a dithered in-phase (I) signal component and a dithered quadrature (Q) signal component associated with the input complex baseband signal using the dithered optical signal and a reference optical signal;
a limiter configured to output a complex decision signal based on the dithered I and Q signal components; and
a digital signal processing (DSP) circuit configured to generate a digital signal representative of the input complex baseband signal based on the complex decision signal.

18. The photonic monobit analog-to-digital converter of claim 17, further comprising:
a laser light source configured to generate the input optical signal and the reference optical signal.

19. The photonic monobit analog-to-digital converter of claim 17, wherein the coherent detector comprises a hybrid coupled to a balanced photodetector, the hybrid configured to receive the coupled signal and the reference optical signal.

20. The photonic monobit analog-to-digital converter of claim 17, wherein the limiter comprises a first limiter configured to generate an I signal component of the complex decision signal based on the dithered I signal component, and a second limiter configured to generate a Q signal component of the complex decision signal based on the dithered Q signal component.

\* \* \* \* \*

UNITED STATES PATENT AND TRADEMARK OFFICE
CERTIFICATE OF CORRECTION

PATENT NO. : 10,833,768 B2
APPLICATION NO. : 16/359263
DATED : November 10, 2020
INVENTOR(S) : Shamee et al.

Page 1 of 1

It is certified that error appears in the above-identified patent and that said Letters Patent is hereby corrected as shown below:

In the Claims

In Column 11, Line 58, in Claim 12, delete "sour free" and insert --spur-free-- therefor Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*